(12) United States Patent
Brandl et al.

(10) Patent No.: US 11,113,898 B2
(45) Date of Patent: Sep. 7, 2021

(54) HALF BOX FOR ULTRASOUND IMAGING

(71) Applicant: GE Precision Healthcare LLC, Wauwatosa, WI (US)

(72) Inventors: Helmut Brandl, Pfaffing (AT); Heinz Schmied, Tiefgraben (AT)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 0 days.

(21) Appl. No.: 16/722,679

(22) Filed: Dec. 20, 2019

(65) Prior Publication Data

US 2021/0192855 A1 Jun. 24, 2021

(51) Int. Cl.
*G06T 19/20* (2011.01)
(52) U.S. Cl.
CPC ........ *G06T 19/20* (2013.01); *G06T 2219/028* (2013.01); *G06T 2219/20* (2013.01)
(58) Field of Classification Search
None
See application file for complete search history.

(56) References Cited

U.S. PATENT DOCUMENTS

| 2006/0111634 | A1* | 5/2006 | Wu | A61B 8/467 600/443 |
| 2010/0106017 | A1* | 4/2010 | Shin | A61B 8/463 600/437 |
| 2016/0287214 | A1* | 10/2016 | Ralovich | G16H 50/20 |
| 2017/0007207 | A1* | 1/2017 | Gauthier | A61B 8/085 |
| 2019/0272667 | A1* | 9/2019 | Roundhill | G06T 19/00 |

OTHER PUBLICATIONS

3D Educational Techniques Volume Rendering: A guide to dcifferent types of rendering tools available in 3D/4D, GE Healthcare, 2008 (2 pgs.).

* cited by examiner

*Primary Examiner* — James A Thompson
(74) *Attorney, Agent, or Firm* — McAndrews, Held & Malloy, Ltd.; Jacob Groethe; David Bates

(57) ABSTRACT

A method for generating an ultrasound image, comprising displaying a rendered image of a target from an edge of a full box encompassing the target. An input regarding a selection of a half box may be received from a user. When the half box is not selected, the rendered image may continue to be displayed. When the half box is selected, a new image may be rendered from a reference of the full box, and the rendered image may be displayed.

20 Claims, 9 Drawing Sheets

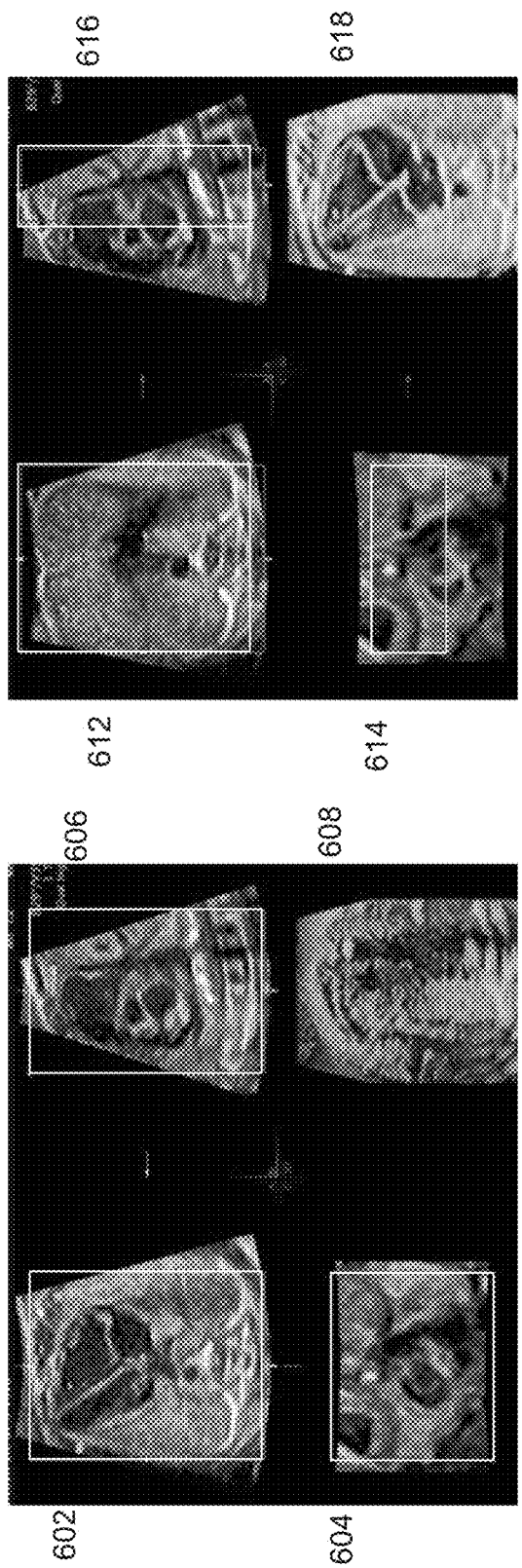
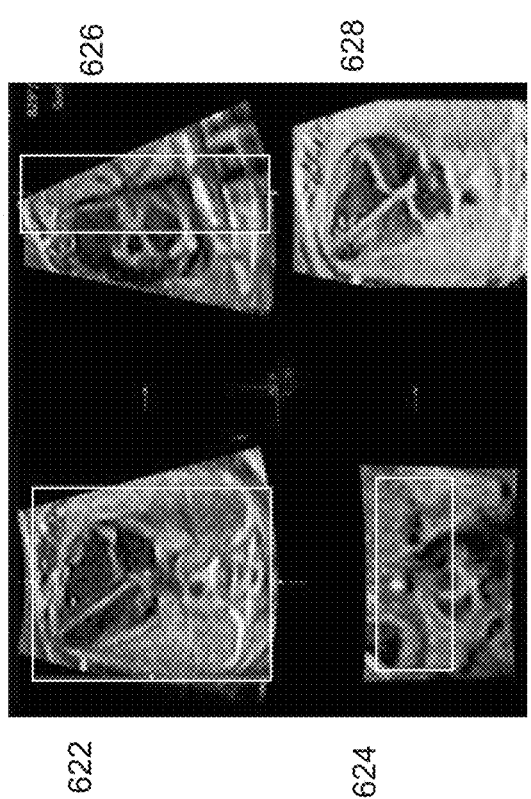
FIG. 6A
FIG. 6B
FIG. 6C

HALF BOX FOR ULTRASOUND IMAGING

FIELD

Certain embodiments relate to ultrasound imaging. More specifically, certain embodiments relate to half box for ultrasound imaging.

BACKGROUND

Ultrasound imaging is a medical imaging technique for imaging organs and soft tissues in a human body. Ultrasound imaging uses real time, non-invasive high frequency sound waves to produce a series of two-dimensional (2D) and/or three-dimensional (3D) images.

Ultrasound-based imaging of a patient may be viewed by a medical practitioner to help diagnose a patient. The medical practitioner may look at different views of a target in the patient.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or a method are provided for half box for ultrasound imaging, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIGS. 6A-6C illustrate images generated with a standard render box for rendering with images generated with a half box for rendering, in accordance with various embodiments.

DETAILED DESCRIPTION

Figure 1:
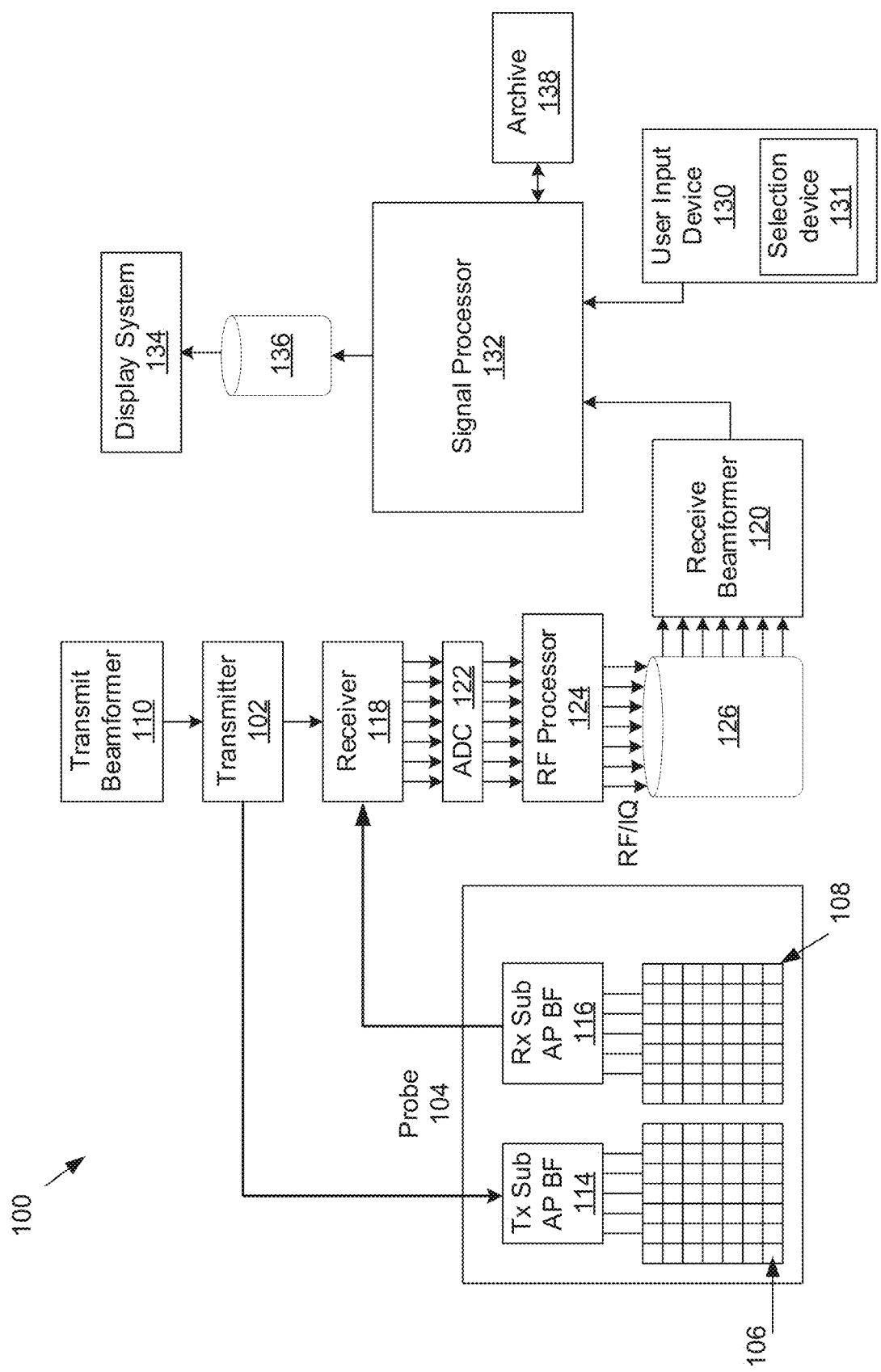
FIG. 1 is a block diagram of an exemplary ultrasound system that may be used for half box in ultrasound imaging, in accordance with various embodiments.

Certain embodiments may be found in a half box for an exemplary ultrasound imaging. Various embodiments have the technical effect of improving views generated by ultrasound image by providing a common starting point for image rendering and for multi-planar slices.

Various embodiments of the disclosure may allow selecting to render an image that may start from a margin of the render region of interest (render-ROI). A render region of interest may also be referred to as a standard render box or a full box. A surface rendering for the full box may be generated from data acquired for a three dimensional volume (3D volume), where the 3D volume may be, for example, a rectangular prism with six sides. The surface rendering may be, for example, a face of the 3D volume or a portion of the surface of the 3D volume. The surface rendering may be useful for viewing, for example, frontal look onto the fetal face: symmetry, nose, lips; a profile view: angulation of forehead and chin in relation to the face (micrognathia), position of the ears (low set ears), etc.; abdominal wall: omphalocele; back, spine (spina bifida, meningocele), neck (hygroma colli); back, spine (spina bifida, meningocele), neck (hygroma colli); extremities: fingers and their positions to each other (clenched fingers as a sign for trisomy), lower legs (club foot); etc.

However, while the external structure may be viewed, the full box does not provide details about the internal structure. For example, while a cleft lip may be recognized, there is not any information as to whether there is also a cleft jaw or cleft palate hidden behind the surface.

Planar slices of the acquired data for the 3D volume may be useful for looking at an internal structure of the target. However, the planar slices may be taken with respect to the center of the 3D volume. Accordingly, the rendered image and the planar slice may be located at different positions of the 3D volume and, thus, show different structures.

Accordingly, various embodiments of the disclosure may allow selecting for rendering with a "half box," where an image rendering process is for the center of the 3D volume. For example, the image rendering may ignore data for a first half of the 3D volume. Rendering of the planar slices also starts from the center of the 3D volume. Therefore, both the image rendering and the planar slices may show images with respect to the same structure. This may be useful, for example, for viewing internal structures or organs.

For example, half box rendering may be useful for viewing internal structures such as, for example, stomach, duodenum (double bubble sign), urinary bladder, kidneys (hydronephrosis), abdominal fluid collections, brain cavities (hydrocephalus); fetal heart: chambers, atria and outflow tracts and their location to each other; gynecology: uterus and ovaries; etc.

Also, as the 3D volume may be a rectangular prism with six sides, the "half box" may be activated with respect to each of the six render directions. If the 3D volume is thought of as having a center at the point (0, 0, 0) of graph having X-Y-Z axes, the portion of the acquired data that is ignored may be along the positive X axis, the negative X axis, the positive Y axis, the negative Y axis, the positive Z axis, or the negative Z axis.

Accordingly, it may be seen that the various embodiments of the disclosure may provide the ability to select a full box (standard render box) to enable surface rendering or a or a "half box" for internal rendering of structures/organs. That is, traditional rendering using a full box may allow viewing three-dimensional surfaces, but no details about the internal structures can be provided. However, a half box rendering may allow a view of the internal structure at the center of the full box in relation to the "surface" that is now being viewed.

For example, a medical practitioner may see a bulging structure on the back of a fetus. The medical practitioner may then switch to a half box and be able to see the internal structures at the location of the bulge. For example, the internal structure of fluid content and spinal bones widening distance may indicate spina bifida. Accordingly, half box rendering provides 2D planar slices at the exact position of the rendered "surface" view.

While a default case of a center (reference) position is described for rendering the planar slices, various embodiments of the disclosure may have a reference position that is not at the center of a full box. For example, the medical practitioner may move the full box to center it about the region of interest, or the medical practitioner may move, for example, a cursor, to shift the reference position. Accordingly, the planar slices may then be taken at the reference that may not be at the center of the full box.

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings. It should also be understood that the embodiments may be combined, or that other embodiments may be utilized and that structural, logical, and electrical changes may be made without departing from the scope of the various embodiments. The following detailed description is, therefore, not to be taken in a limiting sense, and the scope of the present disclosure is defined by the appended claims and their equivalents.

As used herein, an element or step recited in the singular and preceded with the word "a" or "an" should be understood as not excluding plural of said elements or steps, unless such exclusion is explicitly stated. Furthermore, references to "an exemplary embodiment," "various embodiments," "certain embodiments," "a representative embodiment," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

Also as used herein, the term "image" broadly refers to both viewable images and data representing a viewable image. However, many embodiments generate (or are configured to generate) at least one viewable image. In addition, as used herein, the phrase "image" is used to refer to an ultrasound mode such as B-mode (2D mode), M-mode, three-dimensional (3D) mode, CF-mode, PW Doppler, CW Doppler, MGD, and/or sub-modes of B-mode and/or CF such as Shear Wave Elasticity Imaging (SWEI), TVI, Angio, B-flow, BMI, BMI_Angio, and in some cases also MM, CM, TVD where the "image" and/or "plane" includes a single beam or multiple beams.

Furthermore, the term processor or processing unit, as used herein, refers to any type of processing unit that can carry out the required calculations needed for the various embodiments, such as single or multi-core: CPU, Accelerated Processing Unit (APU), Graphics Board, DSP, FPGA, ASIC or a combination thereof.

FIG. 1 is a block diagram of an exemplary ultrasound system that is operable to correct for motion, in accordance with various embodiments. Referring to FIG. 1, there is shown a block diagram of an exemplary ultrasound system 100. The ultrasound system 100 comprises a transmitter 102, an ultrasound probe 104, a transmit beamformer 110, a receiver 118, a receive beamformer 120, A/D converters 122, a RF processor 124, a RF/IQ buffer 126, a user input device 130, a signal processor 132, an image buffer 136, a display system 134, and an archive 138.

The transmitter 102 may comprise suitable logic, circuitry, interfaces and/or code that may be operable to drive an ultrasound probe 104. The ultrasound probe 104 may comprise a two dimensional (2D) array of piezoelectric elements. The ultrasound probe 104 may comprise a group of transmit transducer elements (transmitters) 106 and a group of receive transducer elements (sensors) 108, that normally constitute the same elements. In certain embodiment, the ultrasound probe 104 may be operable to acquire ultrasound image data covering at least a substantial portion of an anatomy, such as the heart, a blood vessel, or any suitable anatomical structure. Each of the transmit transducer elements 106 and the receive transducer elements 108 may be referred to as a channel. The ultrasound prove 104 may also be referred to as, for example, a transducer 104.

The transmit beamformer 110 may comprise suitable logic, circuitry, interfaces and/or code that may be operable to control the transmitter 102 which, through a transmit sub-aperture beamformer 114, drives the group of transmit transducer elements 106 to emit ultrasonic transmit signals into a region of interest (e.g., human, animal, underground cavity, physical structure and the like). The transmitted ultrasonic signals may be back-scattered from structures in the object of interest, like blood cells or tissue, to produce echoes. The echoes are received by the receive transducer elements 108.

The group of receive transducer elements 108 in the ultrasound probe 104 may be operable to convert the received echoes into analog signals, undergo sub-aperture beamforming by a receive sub-aperture beamformer 116 and are then communicated to a receiver 118. The receiver 118 may comprise suitable logic, circuitry, interfaces and/or code that may be operable to receive the signals from the receive sub-aperture beamformer 116. The analog signals may be communicated to one or more of the plurality of A/D converters 122.

The plurality of A/D converters 122 may comprise suitable logic, circuitry, interfaces and/or code that may be operable to convert the analog signals from the receiver 118 to corresponding digital signals. The plurality of A/D converters 122 are disposed between the receiver 118 and the RF processor 124. Notwithstanding, the disclosure is not limited in this regard. Accordingly, in some embodiments, the plurality of A/D converters 122 may be integrated within the receiver 118.

The RF processor 124 may comprise suitable logic, circuitry, interfaces and/or code that may be operable to demodulate the digital signals output by the plurality of A/D converters 122. In accordance with an embodiment, the RF processor 124 may comprise a complex demodulator (not shown) that is operable to demodulate the digital signals to form I/Q data pairs that are representative of the corresponding echo signals. The RF data, which may be, for example, I/Q signal data, real valued RF data, etc., may then be communicated to an RF/IQ buffer 126. The RF/IQ buffer 126 may comprise suitable logic, circuitry, interfaces and/or code that may be operable to provide temporary storage of the RF or I/Q signal data, which is generated by the RF processor 124.

Accordingly, various embodiments may have, for example, the RF processor 124 process real valued RF data, or any other equivalent representation of the data, with an appropriate RF buffer 126.

The receive beamformer 120 may comprise suitable logic, circuitry, interfaces and/or code that may be operable to perform digital beamforming processing to sum, for example, delayed, phase shifted, and/or weighted channel signals received from the RF processor 124 via the RF/IQ buffer 126 and output a beam summed signal. The delayed, phase shifted, and/or weighted channel data may be summed to form a scan line output from the receive beamformer 120, where the scan line may be, for example, complex valued or non-complex valued. The specific delay for a channel may be provided, for example, by the RF processor 124 or any other processor configured to perform the task. The delayed, phase shifted, and/or weighted channel data may be referred to as delay aligned channel data.

The resulting processed information may be the beam summed signal that is output from the receive beamformer 120 and communicated to the signal processor 132. In accordance with some embodiments, the receiver 118, the plurality of A/D converters 122, the RF processor 124, and the beamformer 120 may be integrated into a single beamformer, which may be digital. In various embodiments, the ultrasound system 100 comprises a plurality of receive beamformers 120.

The user input device 130 may be utilized to input patient data, scan parameters, settings, select protocols and/or templates, and the like. In an exemplary embodiment, the user input device 130 may be operable to configure, manage and/or control operation of one or more components and/or modules in the ultrasound system 100. In this regard, the user input device 130 may be operable to configure, manage and/or control operation of the transmitter 102, the ultrasound probe 104, the transmit beamformer 110, the receiver 118, the receive beamformer 120, the RF processor 124, the RF/IQ buffer 126, the user input device 130, the signal processor 132, the image buffer 136, the display system 134, and/or the archive 138. The user input device 130 may include swithch(es), button(s), rotary encoder(s), a touchscreen, motion tracking, voice recognition, a mousing device, keyboard, camera and/or any other device capable of receiving a user directive. In certain embodiments, one or more of the user input devices 130 may be integrated into other components, such as the display system 134 or the ultrasound probe 104, for example. As an example, user input device 130 may comprise a touchscreen display.

The user input device 130 may comprise a selection device 131 that may be as described above for the user input device 130, for example, a switch, a button, a rotary encoder, a touchscreen, motion tracking, voice recognition, a mousing device, keyboard, camera and/or any other device capable of selecting between a standard rendering box ("full box") and a "half box" for rendering as described in this disclosure. The selection device 131 may be used to switch from a standard rendering box to a half box. The half box for rendering is explained in more detail in the later paragraphs describing FIGS. 2-8.

The signal processor 132 may comprise suitable logic, circuitry, interfaces and/or code that may be operable to process ultrasound scan data (i.e., summed IQ signal) for generating ultrasound images for presentation on a display system 134. The signal processor 132 is operable to perform one or more processing operations according to a plurality of selectable ultrasound modalities on the acquired ultrasound scan data. In an exemplary embodiment, the signal processor 132 may be operable to perform display processing and/or control processing, among other things. Acquired ultrasound scan data may be processed in real-time during a scanning session as the echo signals are received. Additionally or alternatively, the ultrasound scan data may be stored temporarily in the RF/IQ buffer 126 during a scanning session and processed in less than real-time in a live or off-line operation. In various embodiments, the processed image data can be presented at the display system 134 and/or may be stored at the archive 138. The archive 138 may be a local archive, a Picture Archiving and Communication System (PACS), or any suitable device for storing images and related information.

The signal processor 132 may be one or more central processing units, microprocessors, microcontrollers, and/or the like. The signal processor 132 may be an integrated component, or may be distributed across various locations, for example. In an exemplary embodiment, the signal processor 132 may be capable of receiving input information from a user input device 130 and/or archive 138, generating an output displayable by a display system 134, and manipulating the output in response to input information from a user input device 130, among other things. The signal processor 132 may be capable of executing any of the method(s) and/or set(s) of instructions discussed herein in accordance with the various embodiments, for example.

The ultrasound system 100 may be operable to continuously acquire ultrasound scan data at a frame rate that is suitable for the imaging situation in question. Typical frame rates range from 20-120 but may be lower or higher. The acquired ultrasound scan data may be displayed on the display system 134 at a display-rate that can be the same as the frame rate, or slower or faster. An image buffer 136 is included for storing processed frames of acquired ultrasound scan data that are not scheduled to be displayed immediately. Preferably, the image buffer 136 is of sufficient capacity to store at least several minutes' worth of frames of ultrasound scan data. The frames of ultrasound scan data are stored in a manner to facilitate retrieval thereof according to its order or time of acquisition. The image buffer 136 may be embodied as any known data storage medium.

The display system 134 may be any device capable of communicating visual information to a user. For example, a display system 134 may include a liquid crystal display, a light emitting diode display, and/or any suitable display or displays. The display system 134 can be operable to present ultrasound images and/or any suitable information.

The archive 138 may be one or more computer-readable memories integrated with the ultrasound system 100 and/or communicatively coupled (e.g., over a network) to the ultrasound system 100, such as a Picture Archiving and Communication System (PACS), a server, a hard disk, floppy disk, CD, CD-ROM, DVD, compact storage, flash memory, random access memory, read-only memory, electrically erasable and programmable read-only memory and/or any suitable memory. The archive 138 may include databases, libraries, sets of information, or other storage accessed by and/or incorporated with the signal processor 132, for example. The archive 138 may be able to store data temporarily or permanently, for example. The archive 138 may be capable of storing medical image data, data generated by the signal processor 132, and/or instructions readable by the signal processor 132, among other things.

Components of the ultrasound system 100 may be implemented in software, hardware, firmware, and/or the like. The various components of the ultrasound system 100 may be communicatively linked. Components of the ultrasound system 100 may be implemented separately and/or integrated in various forms. For example, the display system 134 and the user input device 130 may be integrated as a touchscreen display. Additionally, while the ultrasound system 100 was described to comprise a receive beamformer 120, an RF processor 124, and a signal processor 132, various embodiments of the disclosure may use various number of processors. For example, various devices that execute code may be referred to generally as processors. Various embodiments may refer to each of these devices, including each of the RF processor 124 and the signal processor 132, as a processor. Furthermore, there may be other processors to additionally perform the tasks described as being performed by these devices, including the receive beamformer 120, the RF processor 124, and the signal processor 132, and all of these processors may be referred to as a "processor" for ease of description.

Figure 2:
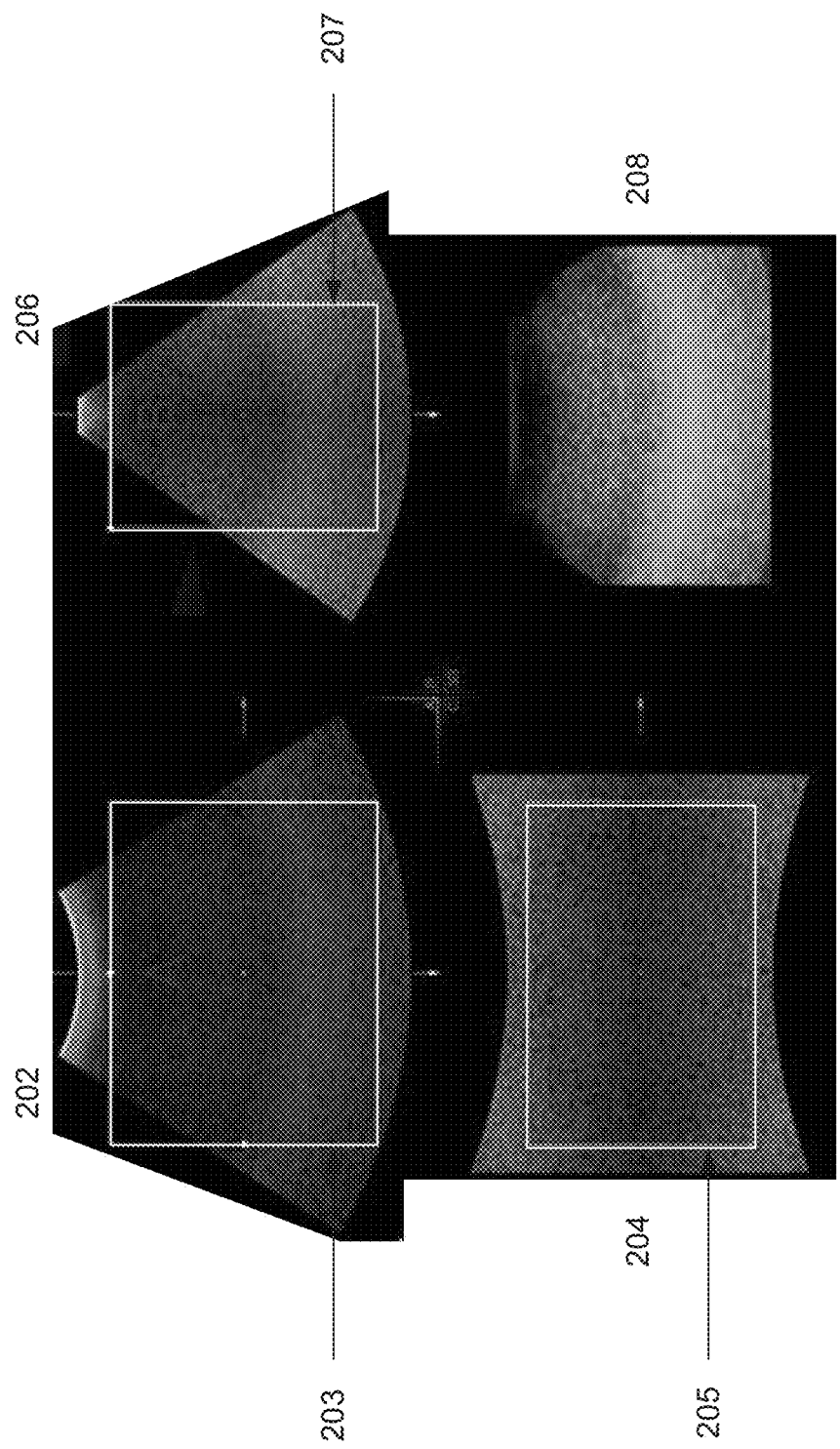
FIG. 2 illustrates use of a standard render box for rendering, in accordance with various embodiments.

FIG. 2 illustrates use of a standard render box for rendering, in accordance with various embodiments. Referring to FIG. 2, there is shown ultrasound images (UIs) 202, 204, 206, and 208. The UI 202 has a standard render box (full box) 203, the UI 206 has a full box 205, and the UI 206 has the full box 207, where the full boxes may be faces of a 3-dimensional (3D) volume. The UIs 202, 204, and 206 are planar slices in directions perpendicular to each other at the center of the 3D volume. For example, the UI 202 may be a sagittal planar slice, the UI 204 may be a coronal slice, and the UI 206 may be a transversal slice. The UI 208 may be a surface rendering.

The full boxes may encompass a target, where the target may be at least a portion of, for example, a patient or an object. The full boxes may also be adjusted different three dimensional volumes of the patient or the object.

Figure 3:
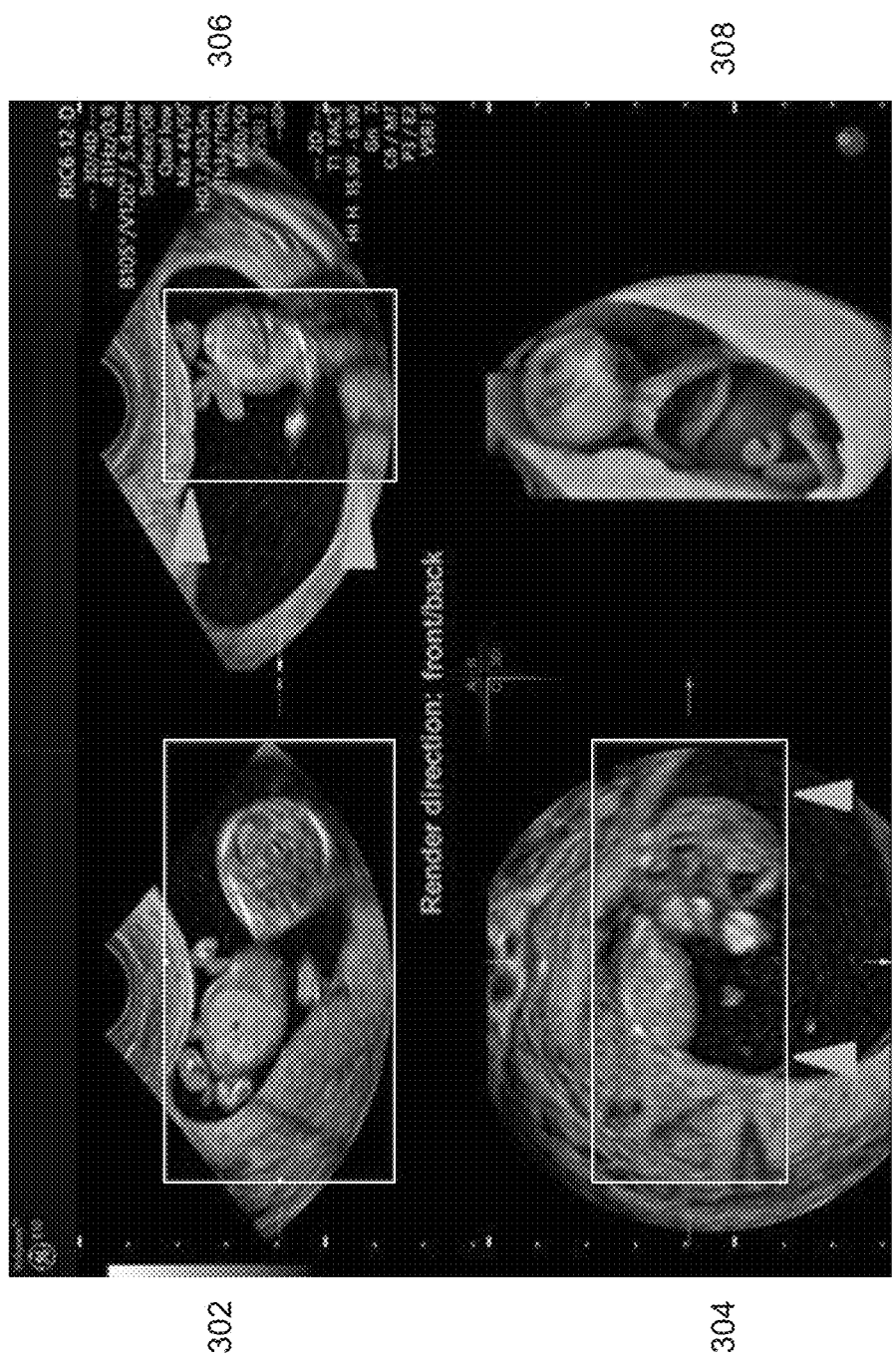
FIG. 3 illustrates use of a standard render box for rendering an image of a fetus, in accordance with various embodiments.

FIG. 3 illustrates use of a standard render box for rendering an image of a fetus, in accordance with various embodiments. Similarly as in FIG. 2, the UIs 302, 304, and 306 may be planar slices of a 3D volume that encompasses a target, where the target is a fetus. The planar slices 302, 304, and 306 are perpendicular to each other, and located at the center of the 3D volume. The render image 308 has a render direction from the front side to the back side of the 3D volume.

Figure 4:
FIG. 4 illustrates use of a standard render box for rendering an image of a face of a fetus, in accordance with various embodiments.

FIG. 4 illustrates use of a standard render box for rendering an image of a face of a fetus, in accordance with various embodiments. Similarly as in FIG. 2, the UIs 402, 404, and 406 may be planar slices of a 3D volume, where the 3D volume encompasses a face of a fetus. The planar slices are perpendicular to each other, and located at the center of the 3D volume. The render direction for the face of the fetus is from top to bottom (up/down).

Figure 5:
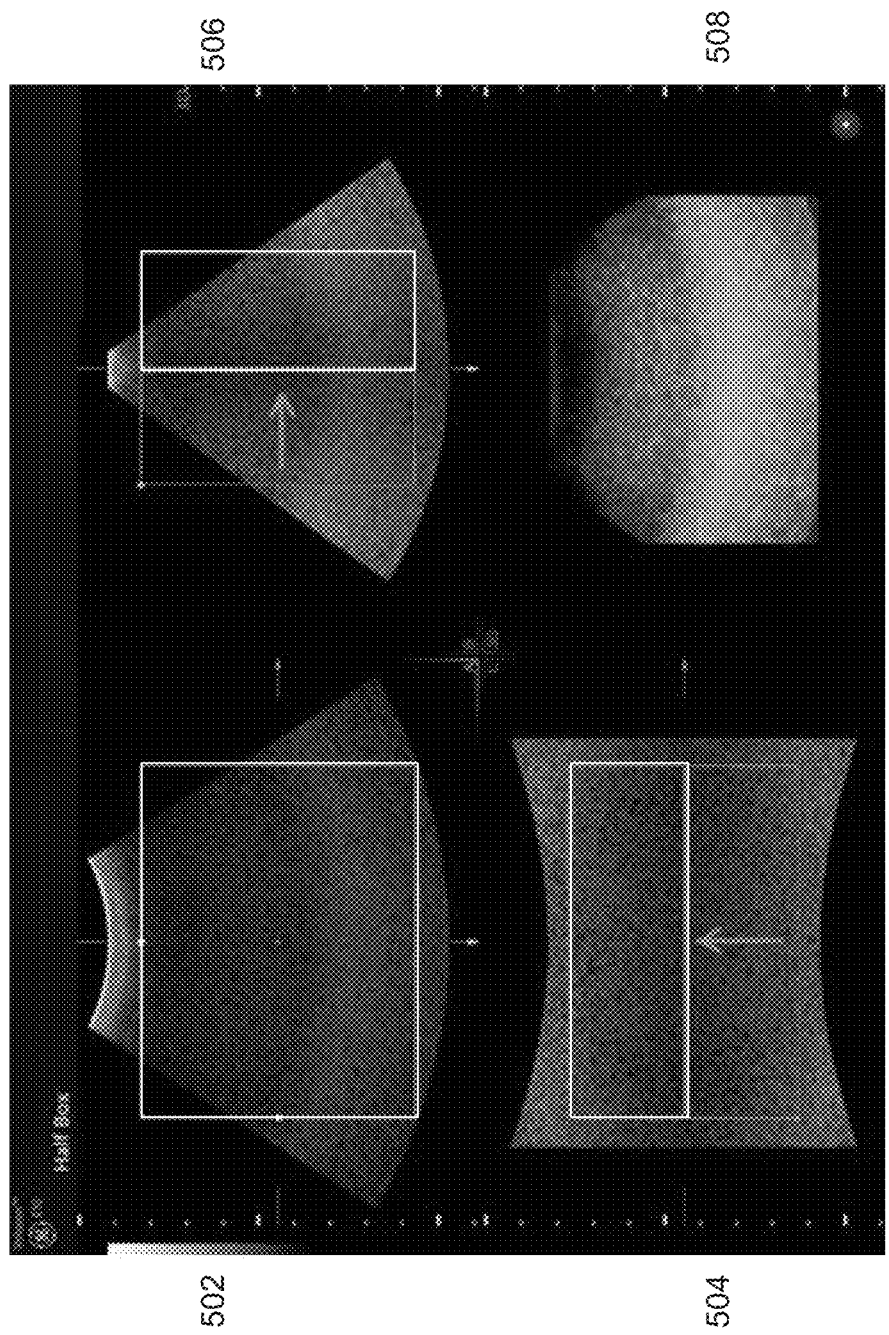
FIG. 5 illustrates use of a half box for rendering, in accordance with various embodiments.

FIG. 5 illustrates use of a half box for rendering, in accordance with various embodiments. Similarly as in FIG. 2, the UIs 502, 504, and 506 may be planar slices of a 3D volume that encompasses a target. The render start position may be shown by the horizontal line in UI 504 that is pointed to by the vertical arrow, and the vertical line in UI 506 that is pointed to by the horizontal arrow. Accordingly, for the half box, the render start position moves to the center of the 3D volume and thus corresponds to the location of the multi-planar slices. As a result, the rendered image 508 may show the anatomical structures that correspond to the planar slices shown in the UIs 502, 504, and 506.

FIGS. 6A-6C illustrate images generated with a standard render box for rendering and images generated with a half box for rendering, in accordance with various embodiments. Referring to FIG. 6A, there is shown a full box for a 3D volume that encompasses a target, which may be, for example, a heart. Similarly as in FIG. 2, the UIs 602, 604, and 606 are planar slices of a 3D volume, where the 3D volume encompasses the heart. It can be seen that the UI 602 shows the four chambers of the heart, and the UIs 604 and 606 show different views of the interior of the heart. However, the rendered image 608 does not show the chambers of the heart since the start position of the rendered image 608 is an edge of the 3D volume that encompasses the heart.

Referring to FIG. 6B, similarly as in FIG. 2, the UIs 612, 614, and 616 are planar slices of a 3D volume, and the UI 618 is a rendered image of the heart. The 3D volume encompasses a portion of a heart to enable the start position for the rendered UI 618 to be the center of the portion of the heart. Accordingly, the UI 618 is a rendered image of a portion of the heart that shows the four chambers of the heart. However, since the rendering of the surface of the "new" 3D volume has shifted to make the center of the "old" 3D volume to be a face of the "new" 3D volume, the UI 612 no longer shows the four chambers of the heart because it is now rendered with respect to the new center of the "new" 3D volume.

Accordingly, it can generally be seen from FIGS. 6A and 6B that either the planar slices may show the desired image, or the rendered image may show the desired image, but the planar slices and the rendered image cannot both render from a corresponding point.

Referring to FIG. 6C, there is shown, similarly as in FIG. 2, the UIs 622, 624, and 626 that are planar slices of a 3D volume, and the UI 628 is a rendered image of the target heart. It can be seen that the UI 622 shows the four chambers of the target heart, and the UIs 624 and 626 show different views of the interior of the target heart, similarly as in FIG. 6A. Moreover, since the half box has the start position at the center of the 3D volume, the rendered image 628 also shows the four chambers of the target heart as in FIG. 6B. Accordingly, it can be seen that using a half box allows for rendered images of the planar slices that correspond in location to the rendered image of a surface.

Figure 7B:
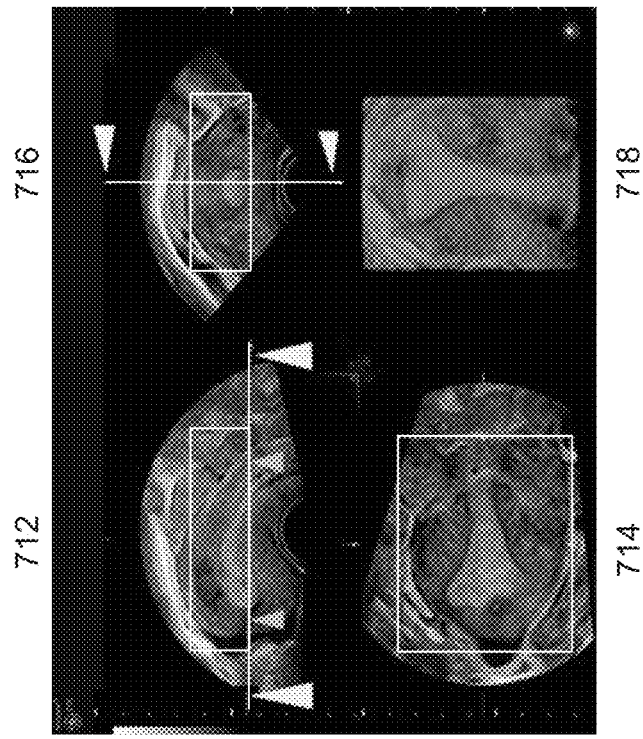
FIGS. 7A-7B illustrate images generated with a standard render box for rendering with images generated with a half box for rendering, in accordance with various embodiments.
Figure 7A:
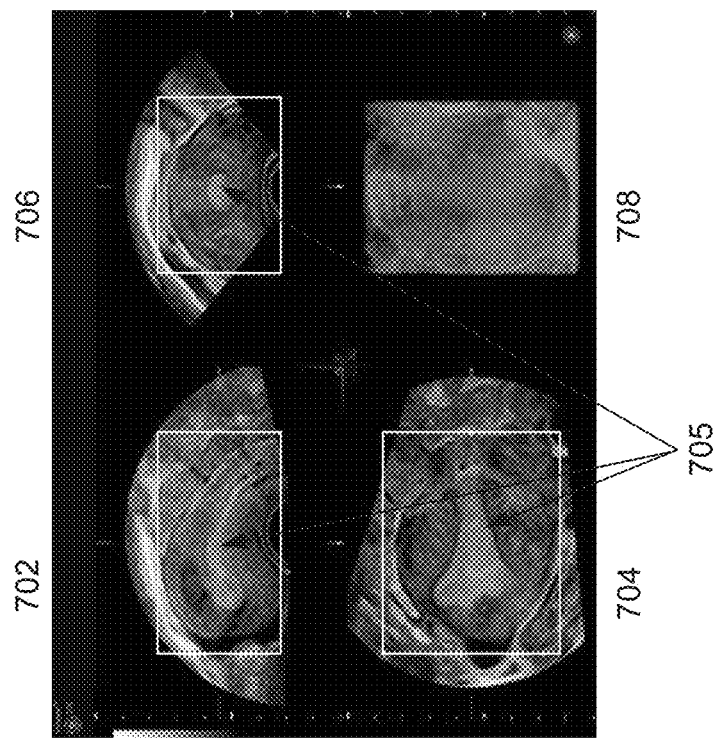

FIGS. 7A-7B illustrate images generated with a standard render box for rendering with images generated with a half box for rendering, in accordance with various embodiments. Referring to FIG. 7A, there is shown a full box for a 3D volume that encompasses a uterus. Similarly as in FIG. 2, the UIs 702, 704, and 706 are planar slices of a 3D volume that encompasses the target, where the target is a uterus. It can be seen that the UI 704 shows the structure of interest, which may be, for example, the endometrium 705. The UIs 702 and 706 show different views of the endometrium 705. However, the rendered image 708 does not show the endometrium 705 since the start position of the rendered image 708 is an edge of the 3D volume that encompasses the uterus.

Referring to FIG. 7B, there is shown, similarly as in FIG. 2, the UIs 712, 714, and 716 that are planar slices of a 3D volume with respect to a center of the 3D volume, and the UI 718 is a rendered image of the target uterus also with respect to the center of the 3D volume. It can be seen that the UI 714 shows the endometrium 705, and the UIs 712 and 716 show different views of the endometrium 705. 7A. Moreover, since the half box has a start position at the center of the 3D volume, the rendered image 718 also shows the endometrium 705 of the target uterus.

Figure 8:
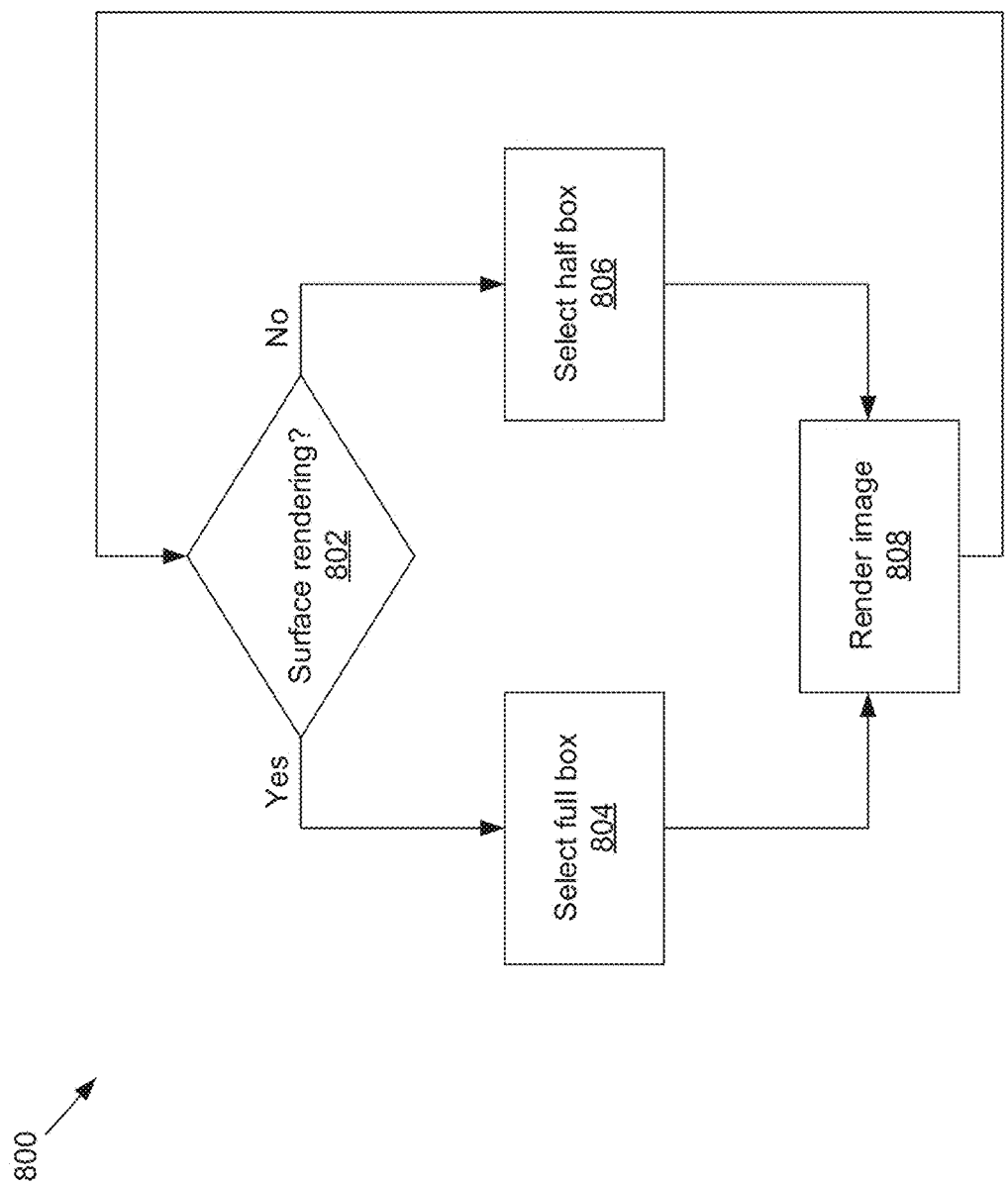
FIG. 8 is a flow diagram illustrating exemplary steps that may be utilized for selectively rendering an image, in accordance with various embodiments.

FIG. 8 is a flow diagram illustrating exemplary steps that may be utilized for selectively rendering an image, in accordance with various embodiments. Referring to FIG. 8, there is shown a flow diagram 800 comprising blocks 802-808. At block 802, a decision may be made by, for example, a user to do surface rendering with a full box, or use a half box for rendering images. The rendering may be performed by one of the processors of the ultrasound system 100 such as, for example, the signal processor 132.

If the user selects to do surface rendering using, for example, the selection device 131, then a full box may be used in block 804 and a surface of the 3D volume may be rendered at block 808. The rendered surface may be displayed, for example, by the display system 134. The surface rendering may be performed using, for example, data acquired for the 3D volume by the ultrasound system 100. For example, the probe 104 may transmit ultrasound signals and receive the reflected ultrasound signals from the target. The received signals may be processed by, for example, the receiver 118, the RF processor 124, the receive beamformer 120, the signal processor 132, etc.

When surface rendering is not selected, that is, when half box rendering is selected, a half box may be used in block 806 and a surface of the 3D volume may be rendered at block 808. When the half box is used, the data up to the center of the 3D volume may not be used so that the "new" surface may be at the center of the 3D volume. Accordingly, the rendered surface may be the "new" surface.

The rendered surface may be displayed, for example, by the display system 134. When the half box is used, there may also be generated one or more planar slices at the center of the 3D volume.

While a "center" of the 3D volume is described as being used for half box rendering, various embodiments of the disclosure may also use a reference that is not in the center of the 3D volume. Rather, a user may move the reference from the center of the full box to another position using the user input device 130 such as, for example, a mouse to move a cursor, or touching a touch screen to indicate the new reference point.

Accordingly, the default reference point may be the center of the 3D volume, and the reference point may be moved. Various embodiments of the disclosure may also keep the reference point to the center of the 3D volume.

Furthermore, there may be an input by the user using the use input device 130 that specifies an orientation for the reference. The 3D volume may have 6 faces, two along each of the X, Y, and Z axes. Accordingly, the orientation of the reference (defaulted as the center) may be looking from the positive part of the X-axis to the origin (0, 0, 0), looking from the negative part of the X-axis to the origin (0, 0, 0), looking from the positive part of the Y-axis to the origin (0, 0, 0), looking from the negative part of the Y-axis to the origin (0, 0, 0), looking from the positive part of the Z-axis to the origin (0, 0, 0), or looking from the negative part of the X-axis to the origin (0, 0, 0).

Various embodiments of the disclosure may automatically determine a full box around a target, where the full box may be adjusted by a user using the user input device 130.

Figure 9:
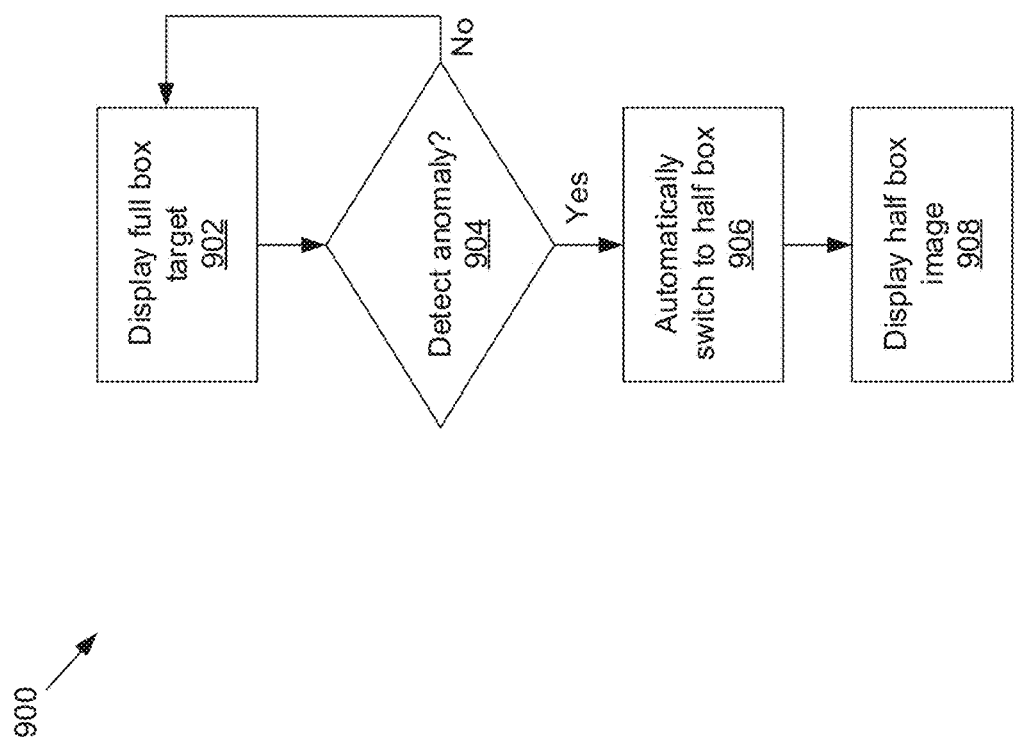
FIG. 9 is a flow diagram illustrating exemplary steps that may be utilized for selectively rendering an image, in accordance with various embodiments.

FIG. 9 is a flow diagram illustrating exemplary steps that may be utilized for selectively rendering an image, in accordance with various embodiments. Referring to FIG. 9, there is shown a flow diagram 900 comprising blocks 902-908. At block 902, a rendered image may be displayed on, for example, the display system 134, of a rendered image using a full box. The rendering may be performed by one of the processors of the ultrasound system 100 such as, for example, the signal processor 132.

At block 904, a processor, such as for example the signal processor 132, may detect an anomaly in the rendered image. For example, the target may be compared to other targets that may have been stored in the ultrasound system 100, for example, in the archive 138 or other storage/memory of the ultrasound system 100.

The processor 132 may use a comparison algorithm that may take into account differences in size and/or shape between the most likely stored target and the target in the rendered image. There may need be, for example, a confidence level of the most likely target being the target before the comparison is made. For example, when the displayed image is a face of a fetus, the rendered image may be given a confidence level that the displayed image is a face. When the confidence level is greater than a threshold value, the rendered image may be compared to one or more targets to determine whether there is an anomaly detected in the rendered image. For example, the processor 132 may notice that the rendered image has a mouth region that is sufficiently different than the stored target images for a face. This may be due to detection of, for example, a cleft lip in the rendered image.

The matching algorithm may look for differences between the rendered image and the stored target image(s) and/or for similarities between the rendered image and the stored target image(s). For example, after detecting a difference between the mouth of the rendered image and a stored image of a face, there may be another comparison of the rendered image with stored images that have defects, such as a cleft lip.

When no anomaly is detected at block 904, the algorithm may go to block 902 for a next image to be displayed. When an anomaly is detected at block 904, the processor 132 may automatically switch to a half box at block 906. The processor 132 may also move the reference of the full box to substantially center the reference on the noted anomaly (e.g., the cleft lip), or move the full box so that the noted anomaly is substantially centered in the full box. Substantially centering may be centering within a predetermined tolerance, where the tolerance may be a default value and/or a value that is entered by a user or selected by a user from a choice of values. An embodiment may also have a processor, such as, for example, the processor 132 select the tolerance based on what the target is. For example, larger targets may have a larger tolerance than smaller targets.

At block 908, the display system 134 may display the half box image that may show the rendered "new" surface image, the planar slices, the "old" surface image, etc.

Various embodiments may flag the image for the user's review. After the user agrees that the flagged image contains an anomaly, the user may have the ultrasound system 100 automatically display the half box image(s) or the user may manually control the half box process for rendering images.

As can be seen, the disclosure provides for a method for generating an ultrasound image. The method may comprise displaying a rendered image of a target from an edge of a full box encompassing the target (802). An input regarding a selection of a half box may be received from a user (804/806). When the half box is not selected, the rendered image may continue to be displayed (808). When the half box is selected, a new image may be rendered with respect to a reference of the full box, and the new rendered image may be displayed (808).

When the half box is selected, at least one slice image of the target with respect to the reference of the full box may be generated (808). The reference of the full box may be set to a default of a center of the full box (808). An input specifying one of six sides of a three dimensional (3D) volume for positioning one or both of the full box and the half box (808).

When the half box is selected, a rendered image of the target may be displayed with respect to the reference of the full box and at least one slice image with respect to the reference of the full box may be displayed (808).

The method may also comprise, for example, automatically recognizing at least a portion of the target to be beyond a predetermined threshold for a shape of the target (904). When the reference is not substantially in a center of the target, the reference may be set to substantially in the center of the target, and there may be automatically switching from the full box to the half box (906). Additionally, when there is an automatic switching to the half box, the rendered image of the target may be displayed (908).

Various embodiments of the disclosure may also automatically determine the full box (808), and an input may be received to move the reference of the full box (808).

Various embodiments of the disclosure may also provide for a system for generating an ultrasound image, where the system may comprise a display 134 configured to display a rendered image of a target with respect to an edge of a full box encompassing the target, and a user input device 130 configured to receive a selection regarding a half box. There may be a processor 132 configured to, when the half box is selected, render a new image with respect to a reference for the full box, and control the display 134 to display the new image. When the half box is selected, the rendered image may be kept displayed on the display 134.

When the half box is selected, the processor 132 is configured to generate for display at least one slice image of the target with respect to the reference of the full box. The processor 132 may be configured to set the reference of the full box to a default of a center of the full box.

The user input device 130 may be configured to receive an input specifying one of six sides of a three dimensional (3D) volume for positioning one or both of the full box and the half box.

When the half box is selected, the processor 132 may be configured to provide a rendered image of the target with respect to the reference of the full box for displaying by the display 134 and provide at least one slice image with respect to the reference of the full box for displaying by the display 134.

The processor 132 may be configured to automatically determine the full box. The user input device 134 may be configured to receive an input to move the reference of the full box.

Various embodiments of the disclosure may further provide for a non-transitory computer readable medium having stored thereon, a computer program having at least one code section, the at least one code section being executable by a machine for causing the machine to perform steps comprising displaying a rendered image of a target from an edge of a full box encompassing the target, and receiving an input regarding selection of a half box. When the half box is not selected, the rendered image may be kept displaying. When the half box is selected, a new image may be rendered from a reference of the full box, and the new image may be displayed.

The machine may also perform steps, when the half box is selected, for generating for display at least one slice image of the target with respect to the reference of the full box. Steps may be performed where the reference of the full box may be set to a default of a center of the full box. There may also comprise steps performed for receiving an input specifying one of six sides of a three dimensional (3D) volume for positioning one or both of the full box and the half box.

As utilized herein the term "circuitry" refers to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" and/or "configured" to perform a function whenever the circuitry comprises the necessary hardware and code (if any is necessary) to perform the function, regardless of whether performance of the function is disabled, or not enabled, by some user-configurable setting.

Other embodiments may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for using half box for imaging.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited.

Various embodiments may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What are claimed:

1. A method comprising:
generating and displaying a full box volume rendering of a three-dimensional (3D) ultrasound volume defined by a full box encompassing a target in a full box rendering mode;
generating and displaying a slice image at a reference position within the full box through the target;
receiving an instruction to switch to a half box rendering mode, wherein the half box rendering mode comprises:
continuing to display the slice image, wherein the reference position of the slice image is one side of a half box; and
generating and displaying a half box volume rendering of the 3D ultrasound volume of the target defined by the half box.

2. The method of claim 1, wherein the full box volume rendering depicts a different view position of the target than the slice image.

3. The method of claim 1, wherein the reference position within the full box is set to a default of a center of the full box.

4. The method of claim 1, wherein:
the half box and the full box each comprise six sides,
the six sides of the half box comprise the slice image and five other sides, and
the five other sides are in common with five of the six sides of the full box.

5. The method of claim 1, wherein the half box volume rendering depicts a same view position of the target as the slice image.

6. The method of claim 1, comprising automatically determining the full box encompassing the target.

7. The method of claim 1, comprising receiving an input to move the reference position within of the full box.

8. The method of claim 1, comprising:
automatically detecting an anomaly by determining a difference between at least a portion of the target in the full box volume rendering and at least one stored target image;
setting the reference position to substantially a center of the anomaly within the full box when the reference position is not substantially in the center of the anomaly; and
automatically switching from the full box rendering mode to the half box rendering mode in response to the automatically detecting the anomaly.

9. The method of claim 1, comprising generating and displaying at least one additional slice image.

10. A system comprising:
an input device configured to receive a selection to switch from a full box rendering mode to a half box rendering mode;
a processor configured to:
generate a full volume box rendering of a three-dimensional (3D) ultrasound volume defined by a full box encompassing a target in the full box rendering mode,
generate a slice image at a reference position within the full box through the target in the full box rendering mode, and
generate a half box volume rendering of the 3D ultrasound volume of the target defined by a half box in the half box rendering mode, wherein the reference position of the slice image is one side of the half box; and
a display configured to:
display the full box volume rendering and the slice image in the full box rendering mode, and
display the half box volume rendering and the slice image in the half box rendering mode.

11. The system of claim 10, wherein the full box volume rendering depicts a different view position of the target than the slice image.

12. The system of claim 10, wherein the reference position of the full box is set to a default of a center of the full box.

13. The system of claim 10, wherein the processor is configured to:
automatically detect an anomaly by determining a difference between at least a portion of the target in the full box volume rendering and at least one stored target image,
set the reference position to substantially a center of the anomaly within the full box when the reference position is not substantially in the center of the anomaly, and
automatically switch from the bull box rendering mode to the half box rendering mode in response to the automatically detect the anomaly.

14. The system of claim 10, wherein the half box volume rendering depicts a same view position of the target as the slice image.

15. The system of claim 10, wherein the processor is configured to automatically determine the full box encompassing the target.

16. The system of claim 10, wherein the input device is configured to receive an input to move the reference position within the full box.

17. A non-transitory computer readable medium having stored thereon, a computer program having at least one code section, the at least one code section being executable by a machine for causing the machine to perform steps comprising:
generating and displaying a full box volume rendering of a three-dimensional (3D) ultrasound volume defined by a full box encompassing a target in a full box rendering mode;
generating and displaying a slice image at a reference position within the full box through the target;
receiving an instruction to switch to a half box rendering mode, wherein the half box rendering mode comprises:
continuing to display the slice image, wherein the reference position of the slice image is one side of a half box; and
generating and displaying a half box volume rendering of the 3D ultrasound volume of the target defined by the half box.

18. The non-transitory computer readable medium of claim 17, wherein the full box volume rendering depicts a different view position of the target than the slice image.

19. The non-transitory computer readable medium of claim 17, wherein the reference position within the full box is set to a default of a center of the full box.

20. The non-transitory computer readable medium of claim 17, wherein the half box volume rendering depicts a same view position of the target as the slice image.

* * * * *